United States Patent
Pack et al.

(10) Patent No.: US 9,658,615 B2
(45) Date of Patent: *May 23, 2017

(54) REMOTE VEHICLE CONTROL SYSTEM AND METHOD

(71) Applicant: iRobot Corporation, Bedford, MA (US)

(72) Inventors: Robert Todd Pack, Hollis, NH (US); Daniel P. Allis, Lynn, MA (US)

(73) Assignee: IROBOT DEFENSE HOLDINGS, INC., Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,396

(22) Filed: Dec. 31, 2014

(65) Prior Publication Data

US 2015/0134146 A1 May 14, 2015

Related U.S. Application Data

(63) Continuation of application No. 13/106,792, filed on May 12, 2011, now Pat. No. 8,954,194.

(Continued)

(51) Int. Cl.
*G05D 1/00* (2006.01)
*G01C 21/26* (2006.01)

(52) U.S. Cl.
CPC .......... *G05D 1/0011* (2013.01); *G01C 21/26* (2013.01); *G05D 1/0038* (2013.01); *G05D 2201/0209* (2013.01)

(58) Field of Classification Search
CPC .... G01C 21/26; G01D 1/0011; G01D 1/0038; G05D 2201/0209

(Continued)

(56) References Cited

U.S. PATENT DOCUMENTS 6,535,793 B2   3/2003   Allard
7,317,987 B2   1/2008   Nahla (Continued)

FOREIGN PATENT DOCUMENTS

| GB | 2523484 B | 4/2016 |
|---|---|---|
| WO | WO-2009019699 A2 | 2/2009 |
| WO | WO-2009/089369 A1 | 7/2009 |

OTHER PUBLICATIONS

International Search Report for Application No. PCT/US2011/036352 dated Jun. 26, 2012.

(Continued)

*Primary Examiner* — Khoi Tran
*Assistant Examiner* — Robert Nguyen
(74) *Attorney, Agent, or Firm* — Jenkins, Wilson, Taylor & Hunt, P.A.

(57) ABSTRACT

A system includes an operator control unit having a point-and-click interface configured to allow the operator to control the remote vehicle by inputting one or more commands via the point-and-click interface. The operator control unit displays a 3D local perceptual space comprising an egocentric coordinate system encompassing a predetermined distance centered on the remote vehicle, a remote vehicle representation having selectable portions, and an icon at a point selected in the 3D local perceptual space and at a corresponding location in an alternative view of a map having an identified current location of the remote vehicle. The system also includes a payload attached to the remote vehicle. The payload includes a computational module and an integrated sensor suite including a global positioning system, an inertial measurement unit, and a stereo vision camera.

20 Claims, 11 Drawing Sheets

Related U.S. Application Data

(60) Provisional application No. 61/334,167, filed on May 12, 2010.

(58) Field of Classification Search
USPC .......................................................... 701/2
See application file for complete search history.

(56) References Cited

U.S. PATENT DOCUMENTS

| | | | |
|---|---|---|---|
| 8,155,787 B2* | 4/2012 | Chalubert | A61F 4/00 700/245 |
| 8,239,087 B2 | 8/2012 | Dybalski et al. | |
| 2005/0216181 A1 | 9/2005 | Estkowski et al. | |
| 2008/0027590 A1 | 1/2008 | Phillips et al. | |
| 2008/0027591 A1 | 1/2008 | Lenser et al. | |
| 2008/0294288 A1* | 11/2008 | Yamauchi | G05D 1/0038 700/258 |
| 2009/0276105 A1 | 11/2009 | Lacaze et al. | |

OTHER PUBLICATIONS

Terrence W Fonfg et al: "Novel interfaces for remote driving: gesture, haptic and PDA", Proceeding of Spie, Spie, US, vol. 4195-33, Nov. 1, 2000, pp. 300-311, XP009118241, ISSN: 0277-786X p. 308-p. 309; figures 12-13.
Australian Office Action for Application No. 2011289866 dated Feb. 11, 2014.
International Search Report for Application No. PCT/US2011/036352 dated Mar. 21, 2012.
Patent Examination Report for Australilan Patent Application No. 2015202581 (Apr. 20, 2016).
Decision to Grant for Great Britain Patent Application No. 1507298.6 (Mar. 15, 2016).
Notice of Allowance for Canadian Patent Application No. 2,799,208 (Mar. 10, 2016).
Letter regarding Notice of Allowance for Israel Patent Application No. 222979 (PCT/US2011/036352).

* cited by examiner

REMOTE VEHICLE CONTROL SYSTEM AND METHOD

CROSS REFERENCE TO RELATED APPLICATIONS

This U.S. patent application is a continuation of, and claims priority under 35 U.S.C. §120 from, U.S. patent application Ser. No. 13/106,792 filed on May 12, 2011, which claims priority under 35 U.S.C. §119(e) to U.S. Provisional Application 61/334,167, filed on May 12, 2010. The disclosures of these prior applications are considered part of the disclosure of this application and are hereby incorporated by reference in their entireties.

TECHNICAL FIELD

This disclosure relates to a remote vehicle control system and method for increasing remote vehicle operator effectiveness and situational awareness.

BACKGROUND

A compelling argument for military robotics is the ability of remote vehicles to multiply the effective force or operational capability of an operator while simultaneously limiting the operator's exposure to safety risks during hazardous missions. The goals of force multiplication and increased operator capability have arguably not been fully realized due to the lack of autonomy in fielded robotic systems. Because low-level teleoperation is currently required to operate fielded remote vehicles, nearly 100% of an operator's focus may be required to effectively control a robotic system which may be a fraction as effective as the soldier. Teleoperation usually shifts the operator's focus away from his own position to the remote vehicle, which can be over 800 meters away to gain safety through increased stand-off distances. Thus, mission effectiveness may be sacrificed for standoff range

SUMMARY

The present teachings provide a system that increases an operator's situational awareness while the operator controls a remote vehicle. The system comprises an operator control unit having a point-and-click interface configured to allow the operator to view an environment surrounding the remote vehicle and control the remote vehicle, and a payload attached to the remote vehicle and in communication with at least one of the remote vehicle and the operator control unit. The payload comprises an integrated sensor suite including global positioning system (or like system) (GPS), an inertial measurement unit (IMU), a stereo vision camera, and a range sensor (e.g., LIDAR), and a computational module receiving data from the GPS, the IMU, the stereo vision camera, and the range sensor and providing data to a CPU including at least one of an autonomous behavior and a semi-autonomous behavior that utilize data from the integrated sensor suite.

The system can also comprise at least one smart camera module, illuminators, and supporting electronics. An interface between the operator control unit and the remote vehicle can include an Ethernet link from the remote vehicle to the payload and a networked radio link from the payload to the operator control unit. The computational module can be configured to provide 3D local perceptual space data for display on the operator control unit, and the 3D local perceptual space data can be stored in a high-performance database that fuses localization sensor data and ranging sensor data using fast geometric indexing and Bayesian evidence accumulation and scan registration functionality. The 3D location perceptual space data can be shared between a remote vehicle operator the at least one autonomous or semi-autonomous behavior.

The system can additionally comprise a behavior engine configured to provide kinodynamic, real-time motion planning that accounts for the dynamics and kinematics of the remote vehicle. A JAUS gateway can be configured to interface with the behavior engine, and can be configured to interface with the 3D local perceptual space data.

The present teachings also provide a method for controlling a remote vehicle by interacting with a display including a representation of the remote vehicle, a map of an environment of the remote vehicle, and a video feed of the environment of the remote vehicle. The method comprises: selecting a part of the remote vehicle representation corresponding to the portion of the remote vehicle to be commanded; and selecting a command for the remote vehicle.

The part of the remote vehicle representation can comprise a chassis, and selecting a command for the remote vehicle can comprise selecting a stair climbing icon. The part of the remote vehicle representation can comprise a chassis, and selecting a command for the remote vehicle can comprise selecting a location in the video feed to which the remote vehicle will drive. The part of the remote vehicle representation can comprise a chassis, and selecting a command for the remote vehicle can comprise selecting a location in the map to which the remote vehicle will drive. The map can comprise a 3D local perceptual space display.

The part of the remote vehicle representation can comprises a manipulator arm, and selecting a command for the remote vehicle can comprise selecting a object in the video feed for the manipulator arm to manipulate. The part of the remote vehicle representation can comprise a manipulator arm, and selecting a command for the remote vehicle can comprise selecting a object in the map for the manipulator arm to manipulate. The map can comprise a 3D local perceptual space display.

The part of the remote vehicle representation can comprise a camera mounted on the remote vehicle, and selecting a command for the remote vehicle can comprise selecting a location in a video feed of the camera that the camera should zoom to. The part of the remote vehicle representation can comprise a camera mounted on the remote vehicle, and selecting a command for the remote vehicle can comprise selecting a location on the map that the camera should pan to. The map can comprise a 3D local perceptual space display.

The method can further comprise looking at the map from more than one perspective by dragging on a displayed widget that changes the map between at least a top view and a forward view.

Additional objects and advantages of the present teachings will be set forth in part in the description which follows, and in part will be obvious from the description, or may be learned by practice of the teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
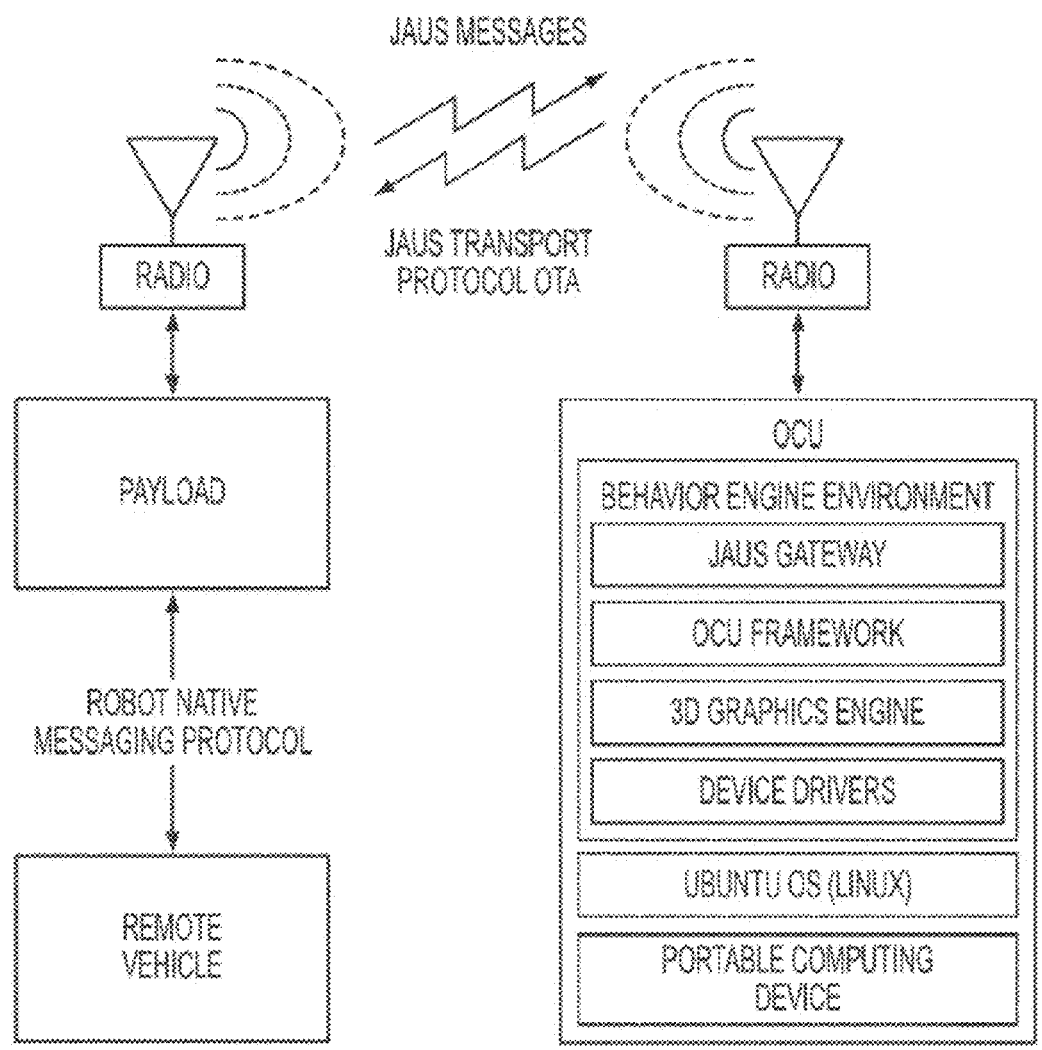
FIG. 1 is a schematic view of an example high level system architecture.

In some implementations, a payload is capable of facilitating supervisory control of a remote vehicle used, for example, for surveillance, mapping, and explosive ordnance disposal (EOD) missions. In some examples, an appropriately-designed map-based "point-and-click" operator control unit (OCU) application facilitates enhanced, shared situational awareness and seamless access to a supervisory control interface. In some implementations, a remote vehicle employs a pan/tilt mechanism for mounting the payload to the remote vehicle chassis, allowing the payload to pan and tilt independent of the vehicle chassis.

In some implementations, displaying a shared 3D local perceptual space (LPS) on an OCU improved provides situational awareness for remote vehicle operators. Employing a supervisory control metaphor for many common remote vehicle tasks may simplify remote vehicle operation. Integration of shared situational awareness can be facilitated by utilizing a 3D LPS display and point-and-click commands within the 3D LPS display and control for navigation and manipulation including target distance estimations. A point-and-click interface can be used to task the remote vehicle and to provide a shared, graphical view of the tasking and a 3D local environment surrounding the remote vehicle.

Combining certain autonomous and semi-autonomous supervisory control behaviors in an integrated package with on-board sensing, localization capabilities, JAUS-compliant messaging, and a tailored OCU with the appropriate interface may maximize the shared understanding and utility of the remote vehicle's capabilities. By reducing operator effort in controlling the remote vehicle, the operator may devote more attention to personal safety and his or her mission. In addition, autonomous or semi-autonomous remote vehicle behaviors may improve the reliability of remote vehicle operation and systems by, for example, preventing common operator error and automating trouble response. Further, a suite of autonomous and semi-autonomous behaviors (which can collectively be referred to herein as autonomous behaviors) utilizing standard sensors and a platform-agnostic JAUS-compliant remote vehicle control architecture may provide a path for interoperability with future JAUS-based controllers and legacy EOD systems.

In some examples, a payload acting as a Joint Architecture for Unmanned Systems (JAUS) gateway provides a JAUS reference architecture compliant remote vehicle command, control and feedback. Standard JAUS messages are employed where they cover relevant functionality. Non-JAUS messages are only utilized to provide capabilities beyond those identified in JAUS reference architecture.

An exemplary behavior engine for a robotic system is described in U.S. patent application Ser. No. 13/105,872, filed May 11, 2011, titled Advanced Behavior Engine, the entire contents of which is incorporated herein by reference. Further an exemplary OCU and user interface for use in a system as described herein is disclosure in U.S. patent application Ser. No. 13/105,833, filed May 11, 2011, titled Navigation Portals for a Remote Vehicle Control User Interface, the entire contents of which is incorporated herein by reference.

The sensory/computational module can include an integrated suite of GPS, IMU, stereo vision, and range sensors that provide a detailed and accurate 3D picture of the environment around the remote vehicle, which can enable the use of sophisticated autonomous behaviors and reduce the need for real-time, "high-bandwidth" and highly taxing operator micromanagement of the remote vehicle. The autonomous behaviors can include special routines for mapping, planning, navigation, manipulation, obstacle detection and obstacle avoidance (ODOA), resolved end-effector motion (e.g., "fly-the-gripper"), retrotraverse, and self-righting in the event that the remote vehicle has rolled over and can physically provide the actuation necessary for self-righting. The OCU includes an application to manage control of and feedback from the payload, and to integrate the payload with a suitable remote vehicle platform.

In situations where the remote vehicle is out of sight, map-based localization and a shared 3D LPS can provide the operator with real-time feedback regarding the remote vehicle's position, environment, tasking, and overall status.

Some implementations are directed toward providing: (1) a principled and robust software architecture that supports a collection of advanced, concurrently-operating behaviors, multiple remote vehicle platforms, and a variety of sensor types; (2) deployable sensors that provide sufficient information to support the necessary level of shared situational awareness between the remote vehicle operator and the on-board remote vehicle autonomy features; (3) lightweight, low-power, high-performance computation unit that closes local loops using sensors; and (4) a user interface that provides both enhanced situational awareness and transparent, intuitive tasking of remote vehicle behaviors.

Referring to FIG. 1, in some implementations, a payload mounts to a remote vehicle and communicates with the remote vehicle using a native messaging protocol of the remote vehicle. The operator control unit (OCU) includes a behavior engine environment including a JAUS gateway, an OCU framework, a 3D graphics engine, and device drivers. The OCU may also include an operating system (e.g., an Ubuntu operating system) and a portable computing device that is preferably ruggedized. The OCU and the remote vehicle/payload communicate wirelessly using JAUS messages and a JAUS transport protocol.

Figure 2:
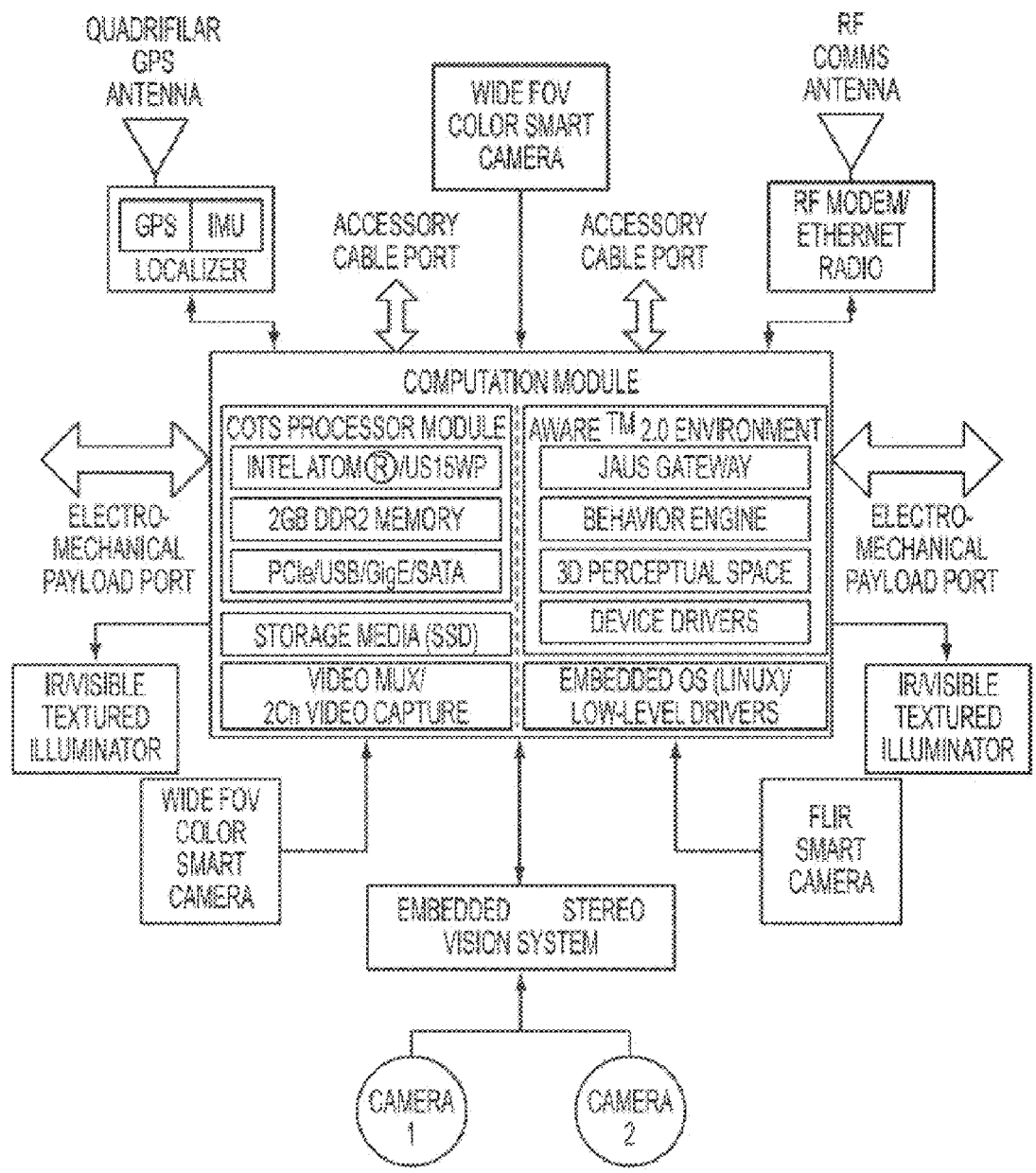
FIG. 2 is a schematic view of an example system architecture for a payload.

FIG. 2 is a schematic view of a system architecture for a payload. The internal architecture of the payload is focused around compact, thermally-capable packaging of high-performance, low-power computation and available sensory modules and components. The payload can integrate, for example, a stereo vision camera such as a Tyzx OEM stereo engine with a computational module along with several smart camera modules, illuminators, and other supporting electronics. The interface to the payload may be flexible through power and Ethernet links to the remote vehicle and a networked radio link between the payload and the OCU. The computation module can additionally include storage media, a video MUX multi-channel video capture, the behavior engine environment shown in FIG. 1, and low-level drivers in the embedded operating system.

The payload may achieve effectiveness by tight integration and ruggedized packaging of core sensing, computation, and communications modules, which can include: (1) stereo vision for dense 3D sensing to feed 3D LPS; (2) multiple smart video sources to feed video with minimal power and computational overhead; (3) GPS/IMU for advanced high-performance position estimation; (4) embedded high-performance computation to provide 3D LPS and autonomy; (5) an optional radio link that can simplify communications for evaluation and testing; and (6) controlled, textured illumination to eliminate failure modes of stereo vision. Stereo vision relies on texture features to extract depth information. When such features are sparse (a common condition in highly structured, smooth indoor environments), sufficient depth data may not be available. However, with the addition of software-controlled, "textured" illuminators, stereo vision can be made robust for use in all environments. The present teachings contemplate utilizing a laser scanning sensor such as LIDAR for range finding in addition to, or as an alternative to, a stereo vision camera.

Figure 3:
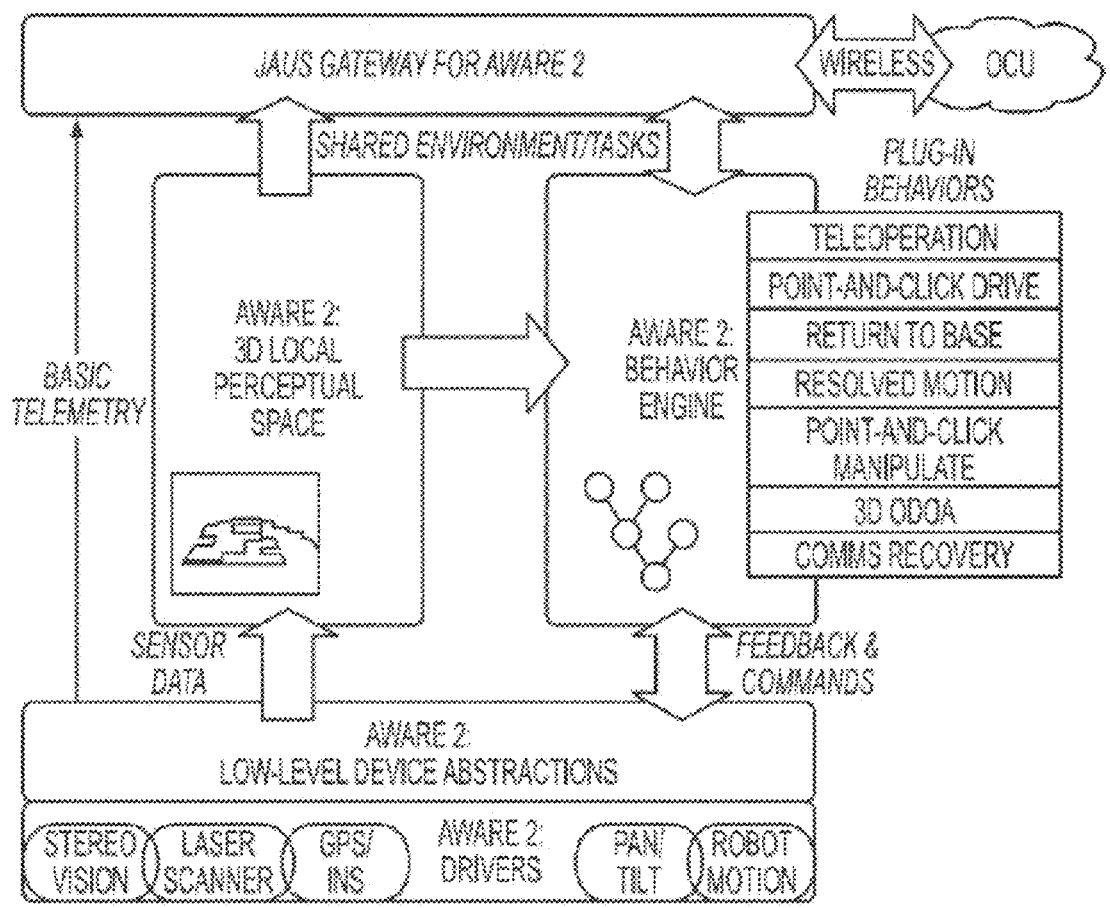
FIG. 3 is a schematic view of an example integration of existing behavior engine technology and a JAUS gateway.

Referring to FIG. 3, in some examples, a 3D local perceptual space (LPS) may include a high-performance database that fuses data from localization sensors (e.g., GPS, IMU, odometry) and ranging sensors (e.g., stereo vision, laser scanners, etc.) using fast geometric indexing and Bayesian evidence accumulation and scan registration functionality. The result is a fast, locally accurate 3D "model" of the environment that can be shared between behaviors and the operator. The example behaviors include point-and-click drive, return to base, resolved motion, point-and-click manipulation, 3D obstacle detection and avoidance (ODOA) and communications recovery. The behavior engine may provide kinodynamic, real-time motion planning that accounts for the dynamics and kinematics of the underlying host remote vehicle.

Both the 3D local perceptual space (LPS) and the behavior engine can be interfaced to the JAUS Gateway. The gateway software module exposes the semi-autonomous capabilities of the behavior engine using JAUS-based messaging to the OCU. JAUS-based messaging may be used for data that is defined by, for example, an existing JAUS Reference Architecture. For some advanced capability, experimental messages may be utilized.

The 3D local perceptual space receives sensor data from the low-level device abstractions and drivers of the behavior engine environment, including data from the stereo vision camera, laser scanner, and GPS/INS. The low-level device abstractions and drivers of the behavior engine can also provide commands to and receive feedback from, for example, pan/tilt position and robot motion.

Figure 4:
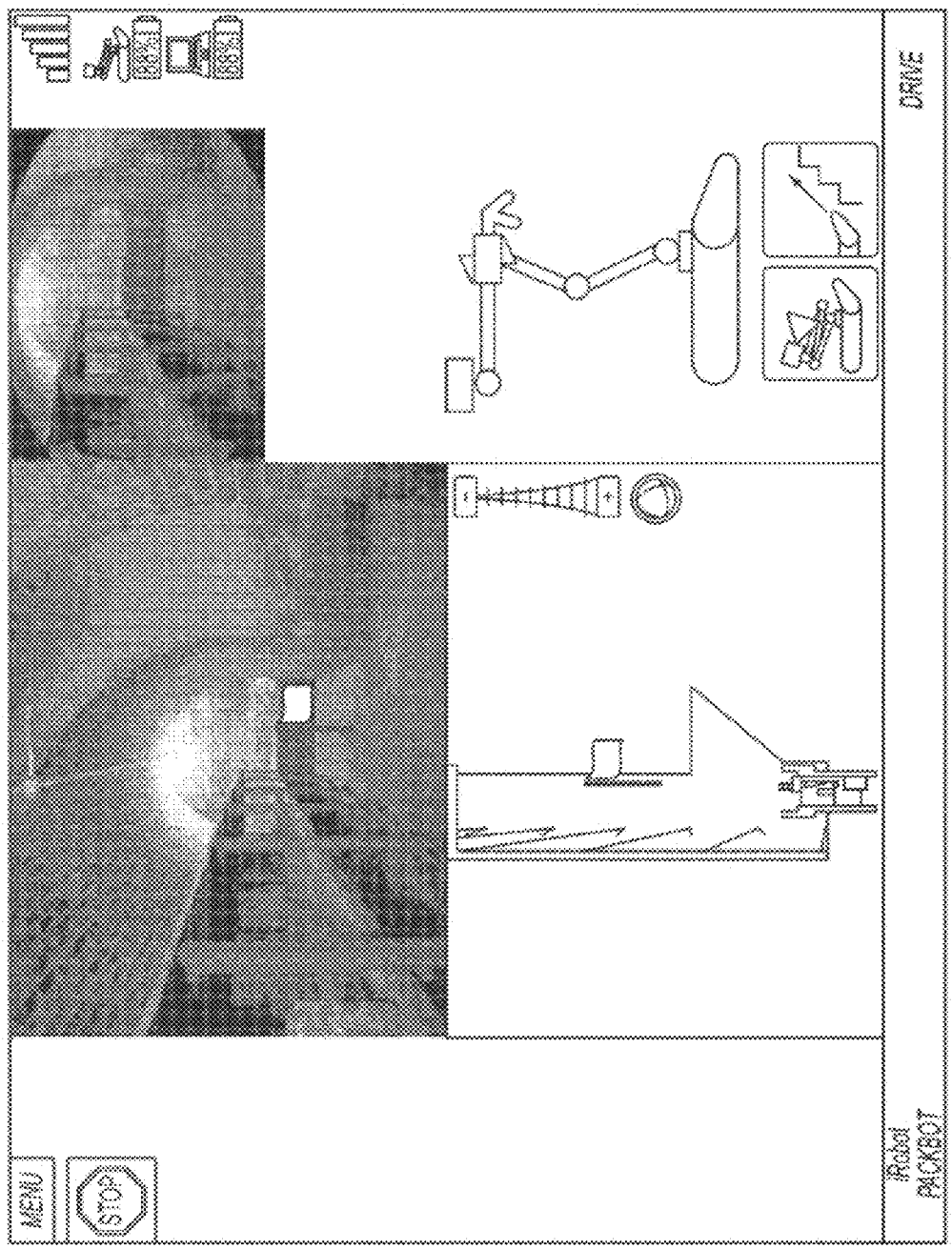
FIG. 4 is a schematic view of an example point-and-click interface.

In some examples, replacing teleoperation and manual "servicing" of remote vehicle motion with a seamless point-and-click user interface may provide semi-autonomous remote vehicle control. An example point-and-click user interface is disclosed in U.S. provisional patent application Ser. No. 13/105,833, filed May 11, 2011, titled Navigation Portals for a Remote Vehicle Control User Interface, which is hereby incorporated by reference. FIG. 4 provides another example point-and-click visual interface. The interface is designed so that an operator can issue high-level commands to the remote vehicle using just a few clicks for each high-level command, utilizing a very simple interface that is capable of interpreting the operator's intentions In order to intuitively control the remote vehicle, the user interface and robot control system can facilitate the following: a first click can select the part of the remote vehicle that the operator wants to command. For example, clicking on the remote vehicle's chassis selects the chassis and indicates that the operator wants to drive around, while clicking the remote vehicle's head camera indicates that the operator wants to look around. Clicking on the remote vehicle's gripper indicates that the operator wants to manipulate an object, and selection of an object in 3D space determines a target of the remote vehicle's manipulator arm. Clicking on a part of the 3D environment can direct the remote vehicle or the manipulator to that location, and can additionally or alternatively show the distance between the end-effector and that part of the 3D environment.

In some implementations, to drive to a location, the operator clicks on the remote vehicle's chassis (to tell the system that he wants to drive the remote vehicle) and then clicks on the video or on the map. A flag (FIG. 4) or other icon can be overlaid on the map, and optionally in other views such as the video and LPS, to indicate the position toward which the remote vehicle is driving, and the remote vehicle moves toward the selected position. To zoom in, an operator can click on the remote vehicle's camera (e.g., a drive camera or a camera on the payload) and then touch a location on a map, video, or LPS image, or drags a box around a part of the map, video, or LPS image that the operator desires to view more closely. In some scenarios, the operator looks at a LPS map view from many perspectives by dragging on a widget that will rotate the map view. For example, the operator may wish to see the LPS map from the remote vehicle's viewpoint (i.e., a forward view) or from a top down viewpoint (i.e., a top view).

The OCU display of FIG. 4 includes two video feeds at a top of the screen, the video feeds being from, for example, a drive camera and a camera located on a manipulator arm. The display also includes, in an upper right-hand corner, status information including a communication link status, a robot power status, and an OCU power status. A lower right quadrant of the exemplary display includes a representation of the remote vehicle that can, in certain embodiments, inform the operator of the remote vehicle's pose, configuration, and even orientation. Below the remote vehicle representation are icons that can be used to initiate behaviors such as, for example, a stair climbing behavior. The lower left quadrant of the display can include, for example a map or other representation of the remote vehicle's environment. The above-referenced flags, indicating a desired destination for the remote vehicle, are shown in the LPS map and the left video feed of the exemplary display of FIG. 4.

In some examples, depending on the part of the remote vehicle selected, the system displays a list of available remote vehicle behaviors that are appropriate for the selected remote vehicle part. For instance, if the operator clicks on the remote vehicle's chassis, the system can display a stair climbing button as shown in the lower right-hand corner of FIG. 4. The operator may select stairs for the remote vehicle to climb by clicking on the stairs in the video or on the displayed map, and then the operator may press the stair climbing button to move the remote vehicle to the selected stairs and begin the stair climbing behavior.

Figure 5:
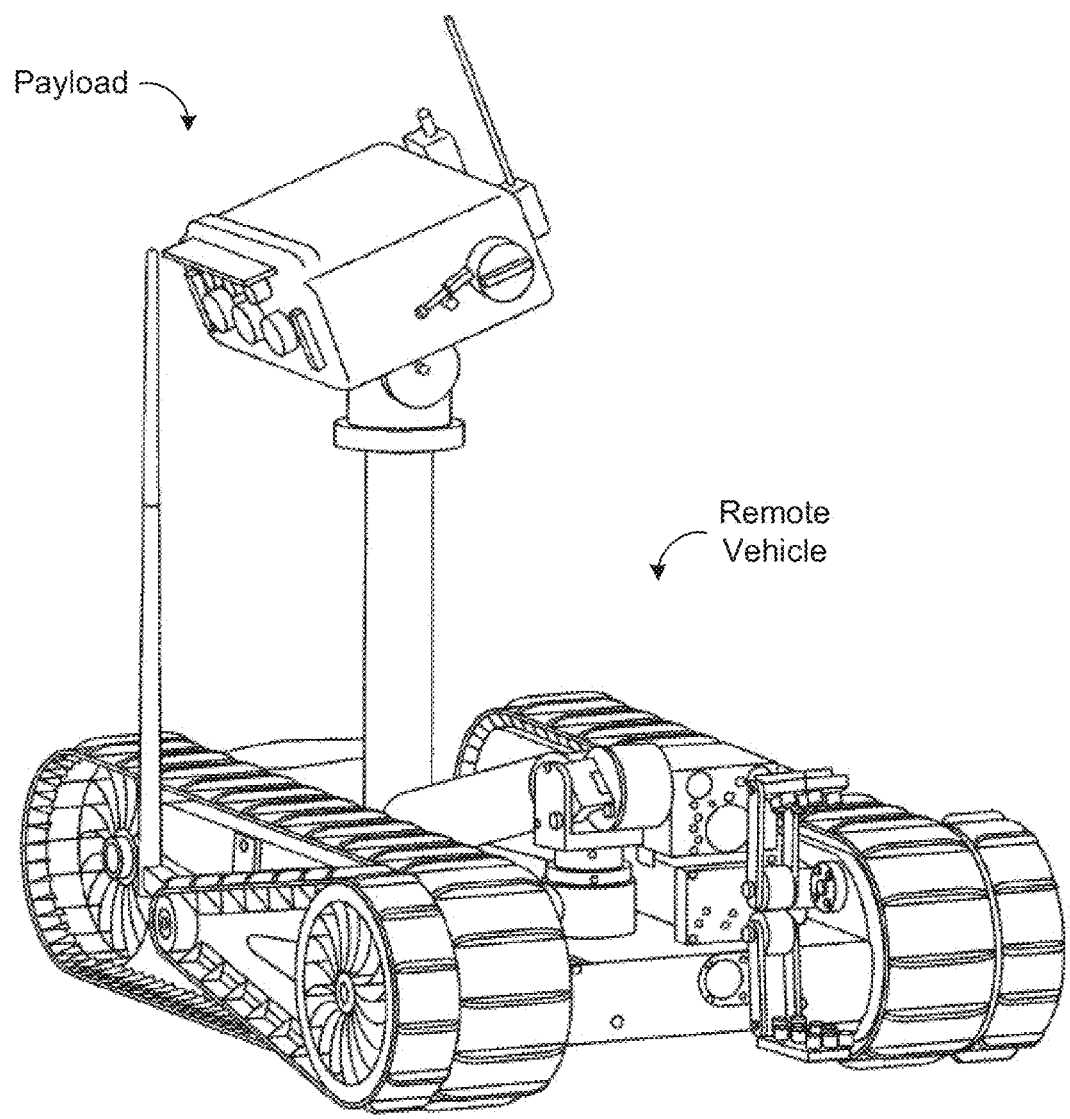
FIG. 5 is a schematic view of an example remote vehicle including a payload.
Figure 6:
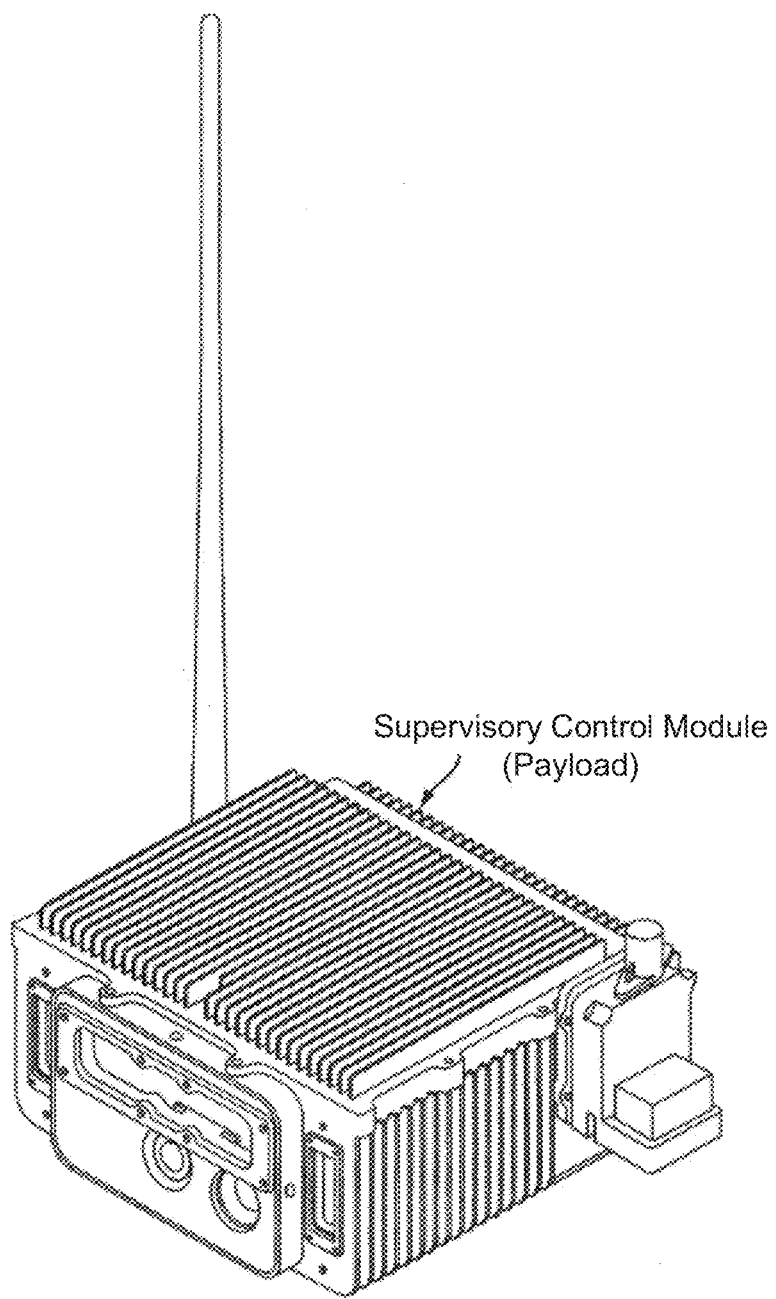
FIG. 6 is a schematic view of an example payload.
Figure 7:
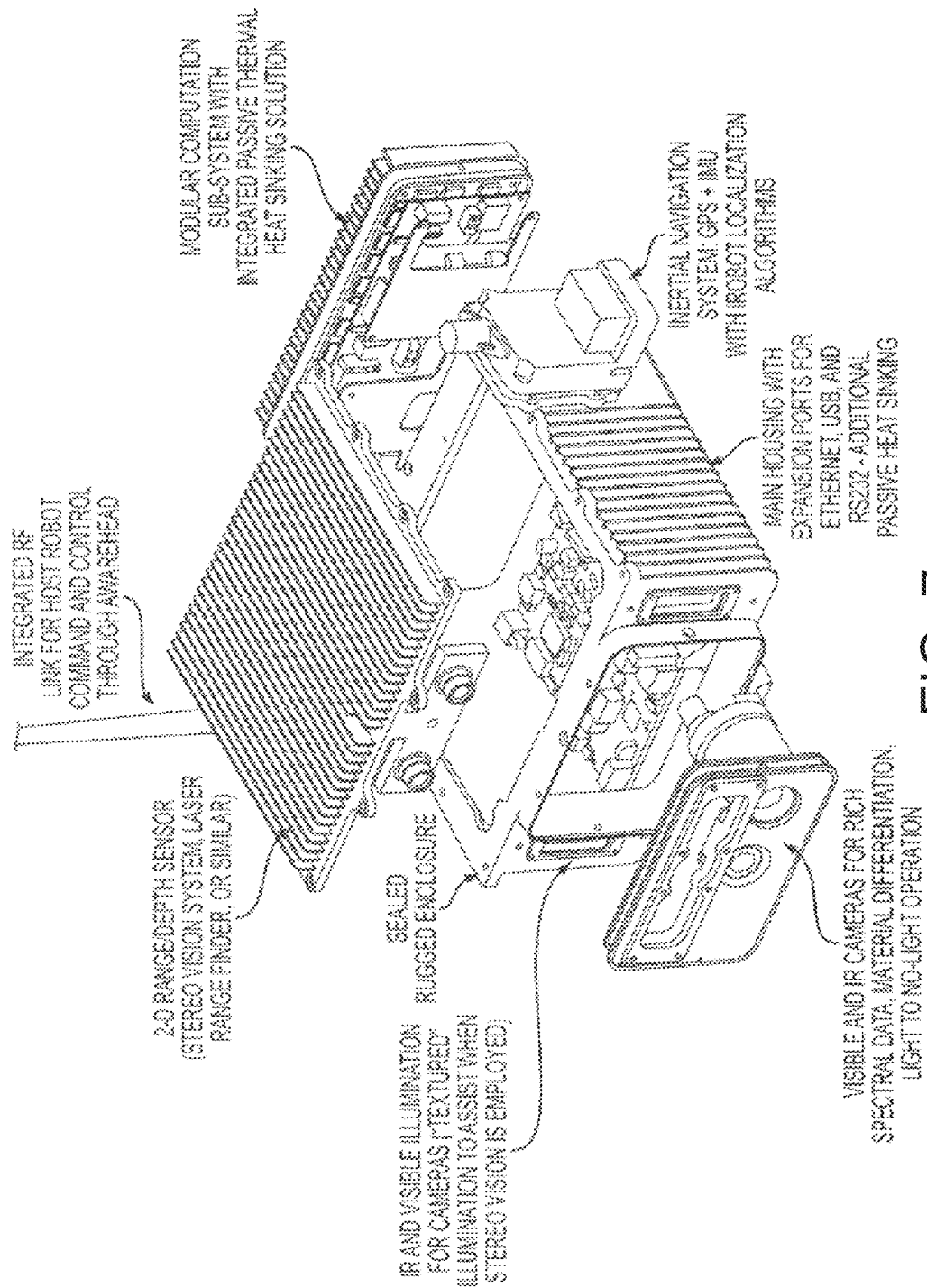
FIG. 7 is an exploded view of the payload of FIG. 6.
Figure 8:
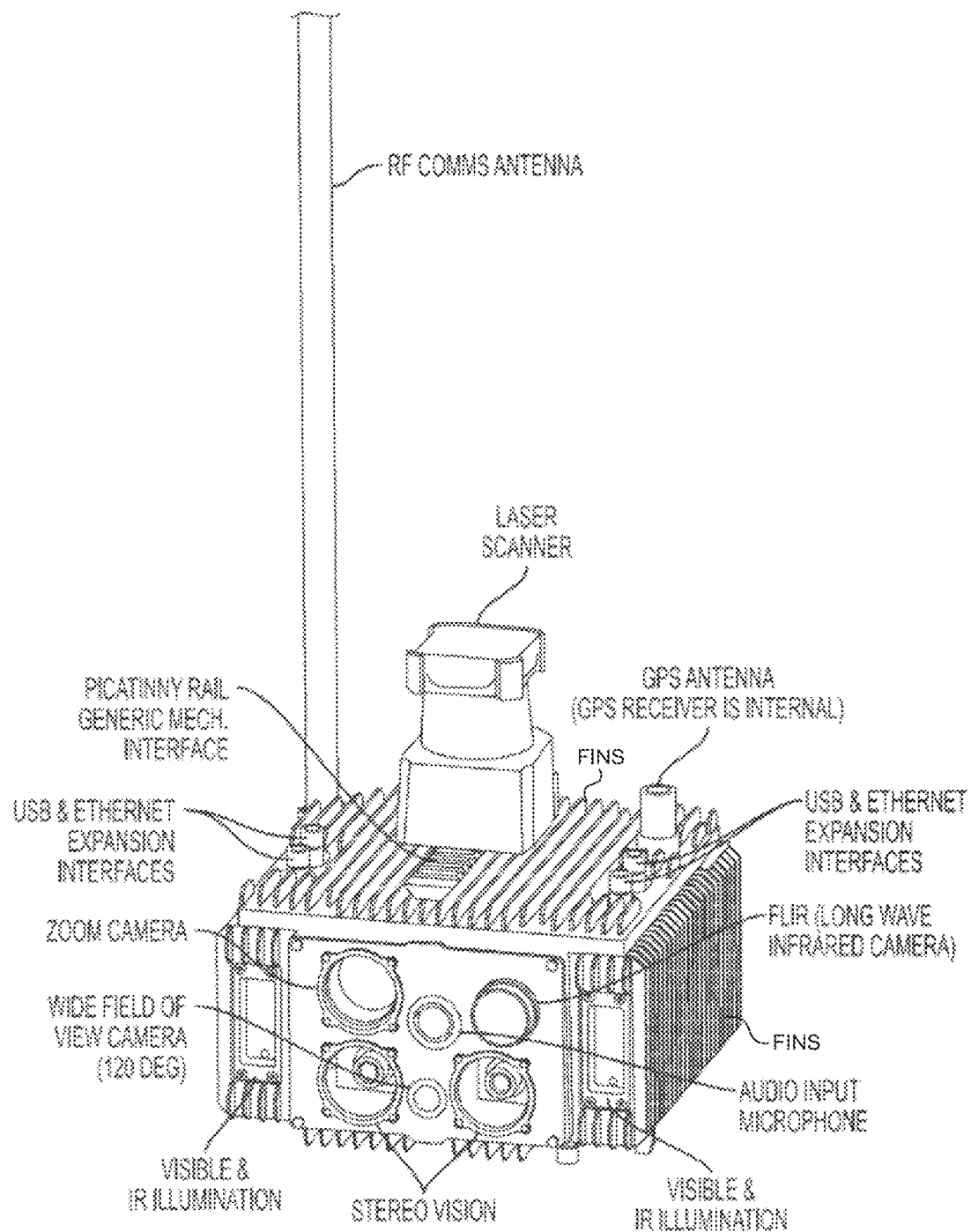
FIGS. 8-11 are schematic views of an example payload.

FIG. 5 is a schematic view of an example remote vehicle including example payload. The payload may attach to the remote vehicle using a mast and a pan/tilt mechanism. Referring to FIGS. 6 and 7, in some implementations, an example payload includes visible and IR cameras that provide spectral data, material differentiation, and operation in low-light environments. A stereo vision system and a laser range finder (e.g., LIDAR) may provide 2D range/depth sensing. IR and Visible illumination and IR may be provided for the visible and IR cameras. Visible illumination may include "textured" illumination to assist when stereo vision is employed. An integrated RF link can be used to facilitate control of the remote vehicle by allowing communication between the payload and the OCU.

Example payloads may include an inertial navigation system that includes GPS and an IMU with localization algorithms. A modular computational subsystem can also be provided in the payload, and can include an integrated passive thermal heat sink. The main housing of the payload can include expansion ports, for example for Ethernet, USB, and RS, along with additional passive heat sinking. In certain embodiments, the payload can comprise a sealed, rugged enclosure.

FIGS. 8-11 provide another example payload that may mount on the remote vehicle via, for example, a mast and pan/tilt mechanism as described above. The payload can optionally include a laser scanner mounted on a top thereof. Top mounting of the laser scanner can provide an improved field of view for the laser and therefore improved range data therefrom. The laser scanner can include, for example, LIDAR.

The example payload of FIGS. 8-11 may also include some elements that can be the same as or similar to the example payloads of FIGS. 5-7. For example, the example payload of FIGS. 8-11 may include an RF communication antenna, a GPS antenna, visible and IR illuminators on front sides thereof, a stereo vision camera (e.g., the stereo vision camera mounts lower in the payload of FIGS. 8-11 than the payload of FIG. 7), and a long-wave infrared camera. The example payload may additionally include two additional cameras, including a camera having a wider field of view (e.g., 120° field of view) and a zoom camera. In addition, the payload of FIGS. 8-11 includes a Picatinny rail (a bracket sometimes utilized on firearms) on which the laser scanner can be mounted, USB and Ethernet expansion interfaces extending from a top side of the payload housing, a GPS receiver located in the housing (along with the IMU), and an audio input microphone. Passive heat sink fins are located on at least a portion of the top, bottom, sides, front, and back of the payload housing to ensure that heat is adequately removed from the system. The heat sink fins can be required when the payload must be sealed from water and or dust, because such sealing prohibits use of a fan. In addition, a fan can add unwanted weight to the payload.

Figure 9:
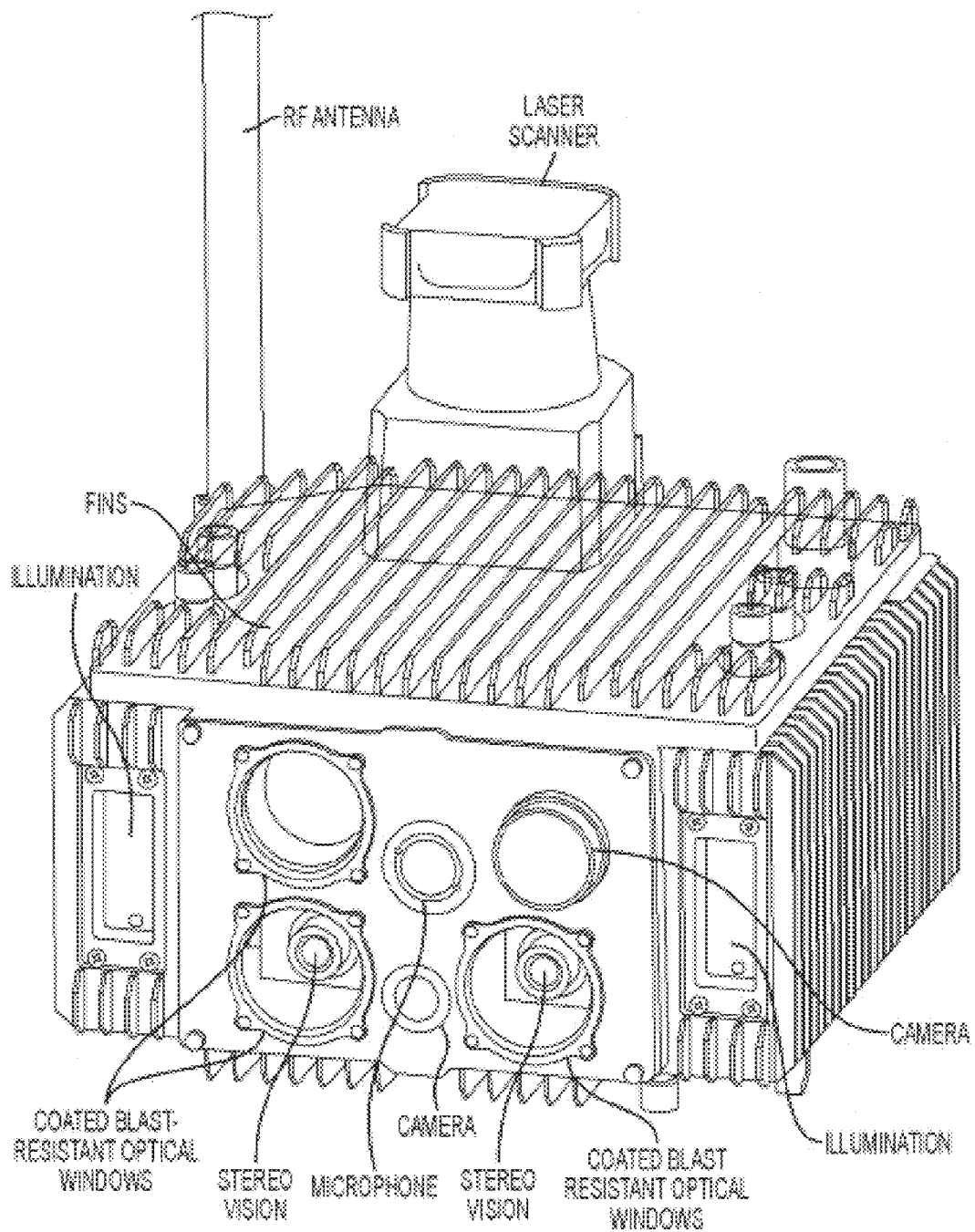
Figure 10:
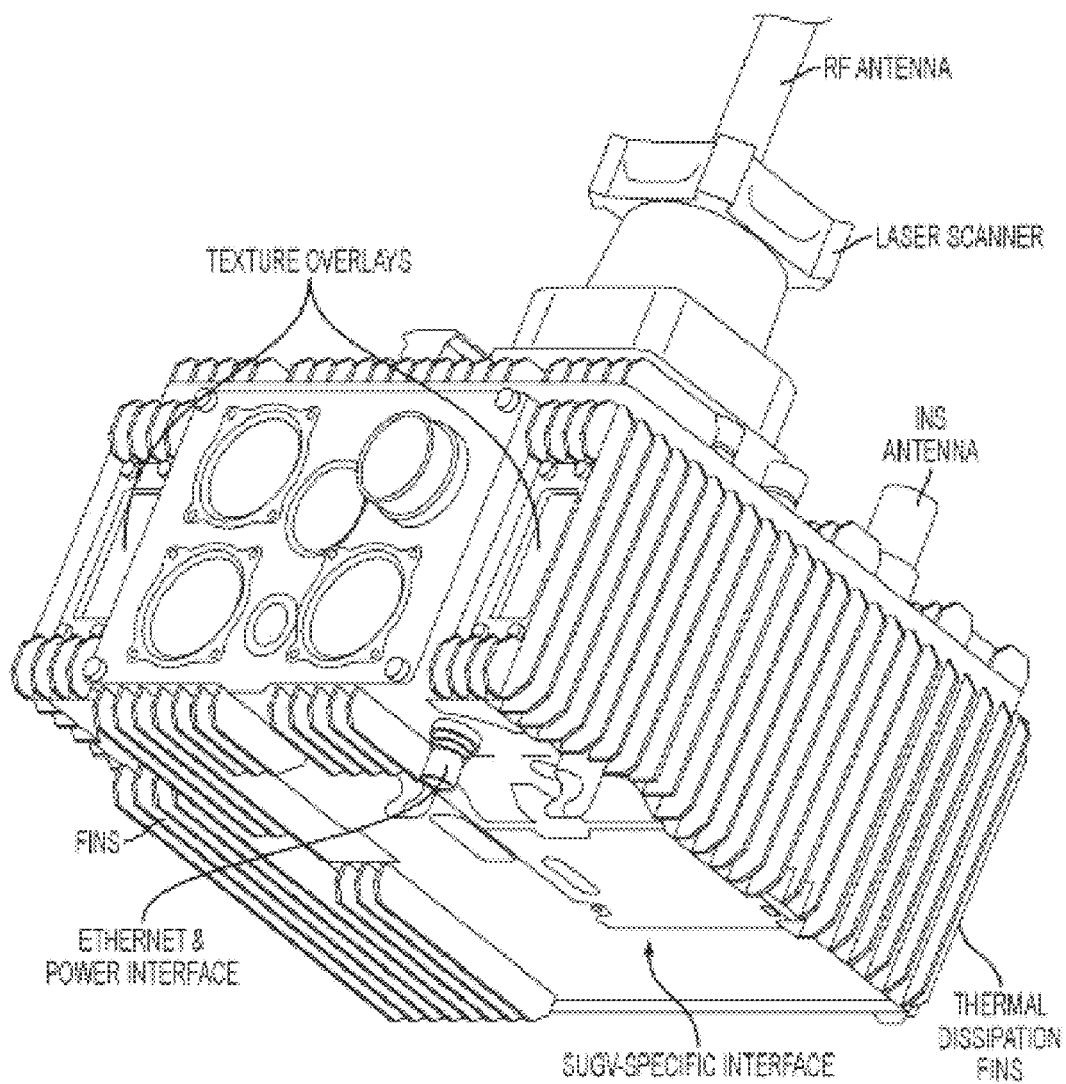
Figure 11:
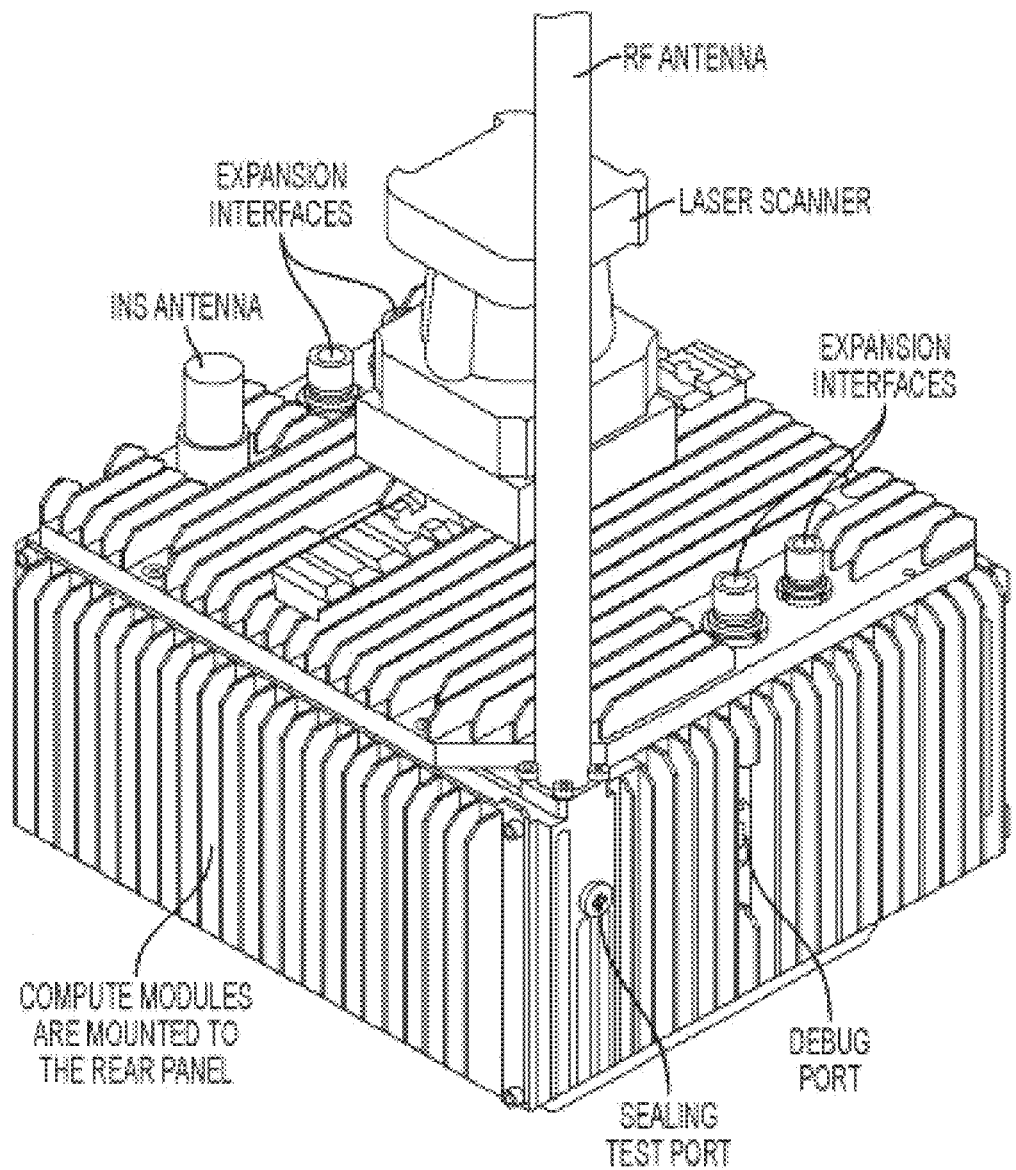

Referring to FIG. 9, a plate having blast resistant optical windows can be placed in front of at least some of the cameras for increased durability. FIG. 10 provides texture overlays that can be placed over at least the visible illuminators, along with a bottom portion of the payload that comprises heat sink fins, a generic Ethernet and power interface for additional integration platforms, and a remote vehicle-specific plug or interface. FIG. 11 provides a rear panel to which the compute modules mount, a sealing test (e.g., vacuum test) port, and a debug port. In some implementations, the example payload includes a volume of less than about 144 cubic inches and weighs less than about six (6) pounds. The payload may include a maximum linear dimension of about eight (8) inches.

In some examples, maximizing a surface of the payload provides a thermal solution to keep the payload cool enough through passive heat convection. Maximizing the surface can be achieved as shown, using heat dissipating fins on the external enclosure. In some examples, the passive heat reduction of a payload can shed about 500 milliwatts per square inch of nominal surface area (before adding heat fins).

Some implementations contemplate a payload that can minimize a moment load on the manipulator arm. Pin-type heat dissipation fins could be employed instead of, or in addition to, the blade-type heat dissipation fins. A tighter integration of the laser scanner into the payload is also contemplated, as well as the use of multi-planar laser scanners, and alternative or additional optical/vision-based ranging sensors (e.g., ASC Ladar, PrimeSense, improves GPS and INS systems, additional object recognition and other useful vision-based algorithms and supporting camera for the same). Using multiple laser scanners and/or stereo vision systems to cover 360° around the payload may also be contemplated.

Some examples provide transient power distribution of about 45 W steady state and about 60W transient power dissipation for external operating temperatures from about −21° C. to about +40° C. (with a stretch goal of, for example about −25° C. to about +49° C.). In some implementations, the payload includes about 2.5 pounds of heat dissipating aluminum. The orientation of heat dissipation surfaces can be such that cooling is optimized for the stationary operation since stationary manipulation can be a requirement of the system at least during some of a mission. However, where possible, a "dual purpose" design can be employed that is maximally efficient when stationary and even more efficient when the remote vehicle is in motion. Keeping computation together with sensing can help make the system more modular, with sensor and computation upgrades consisting of, for example, complete payload replacement as new computation and sensor technologies provide a more desirable Size Weight and Power (SWaP) performance. In accordance with various embodiments, the chassis can become more of a "dumb" chassis and the payload can provides the higher degrees of capability (e.g., both autonomous and non-autonomous).

Depending on a configuration of the payload, the present teachings comprise achieving 2-4 times the surface area by adding heat dissipating fins before the fins start to become less efficient. For instance, the internal heat generating sources can be coupled directly to the payload housing, which then convects heat to the external atmosphere. Because all surfaces of the payload can provide heat sinking, all surfaces can be given heat dissipating fins except for surfaces that require camera lenses, connectors, or other interfaces. If nothing is mounted to the Picatinny rail of the example payload of FIGS. 8-11, the system can dissipate heats even more efficiently (blocking air flow with the Picatinny rail will cause the lid to perform at reduced efficiency due to disruption of air flow.

In some implementations, the system/payload includes four (4) pieces including a compute panel (rear panel), a power and Ethernet switching and distribution panel (top panel), a Stereo Vision and internal signal routing portion (main housing), and front camera windows (front panel). Breaking the payload into four pieces can improve serviceability and modularity of the payload. The present teachings contemplate constructing a more integrated housing, but at a higher potential cost due to more complex manufacturing.

Much of the physical structure of the payload can be defined by an optimal configuration of heat-producing components and a best thermal path to the external environment. While example technologies could employ more expensive/complex technologies (e.g., heat pipes and other thermal conduction elements) to change an overall configuration of the payload, such technologies could undesirably add weight and cost to the payload.

Given other components of the payload and the bounds imposed by the remote vehicle's physical structure and a size of the payload's sensors and other components, the back panel can provide a good position for processor(s) of the payload, for example two Atom CPU modules. Additionally, a vertically-oriented heat fin is the most efficient orientation for heat fins matched to the high relatively high thermal generation of the processor(s) (e.g., 6 Watts for each CPU).

In accordance with various embodiments, the following components of the payload can be coupled to the housing: CPUs, Ethernet Switches, FPGAs, DSPs, LED illuminators, and some MOSFET components. Some of the components can be attached to the housing using, for example, thermal gap pads. Many low power compute modules can be distributed in a way that does not require any additional or special thermal coupling elements.

In some implementations, packaging illumination using existing LED illumination packages provides suitable light. Additionally or alternatively, some implementations contemplate providing 3-D visualization with a single camera and multiple light sources. Textured illumination can require some additional enhancement including a focusing element allowing an overlay to project a distinct pattern onto textureless surfaces and increase the capability of the stereo vision system.

In some examples, the exterior surface of the housing provides a variety of external connectors for sensor expansion including, for example, USB 2.0 (2X) and Gigabit Ethernet (2X). In some implementations, Glenair Mighty Mouse Series 80 connectors is utilized as they are becoming an industry standard in UGV/UAV circles. The Glenair sensors are sealed for submersion in water and provide general expansion as new sensors come along. The placement of the connectors can be on a top surface of the payload, for easy access and because that is the only surface presently having room for expansion that doesn't interfere with the remote vehicle housing.

In some implementations, the orientation and position of all mobile elements of the complete remote vehicle system (manipulators, arms, chassis, etc.) must be known in order to back-calculate a position of those mobile elements with respect to the payload. Absolute encoders may serve this function. An IMU can alternatively or additionally be used, but might be more time consuming than the real time updates from encoders. As long as one IMU provides real-world orientation and enough information is known about the orientation of mobile elements in the system, the payload knows its place the world.

The payload may have IP67 or better (e.g., one (1) meter depth testing without significant leaks). Sealed boxes can suffer from a lack of air exchange to aid thermal exchange. That is the reason for designing in as many direct thermal paths between hot items and the outside world. Using a waterproof external fan could help with the thermal concerns, but can introduce a robustness risk. There are some "fans" that use membranes that effectively don't have moving parts, are sealed and could be employed, but that would add cost and complexity.

A modular computation system, as used herein, can include CPU modules that meet a sub-set of an international standard (COM Express Type 2 interface). In some implementations, the CPU modules and the rest of the system can be split so that CPUs reside on a separable rear panel that can be individually assembled, tested and used in other designs. A GPS, GLONASS, or GALILEO or aerial-based portion sensing equipment may be employed interchangeably.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for controlling a remote vehicle by interacting with a display, the method comprising:
    displaying on the display an interface configured to allow an operator to view an environment surrounding the remote vehicle and control the remote vehicle;
    displaying on the display a 3D local perceptual space comprising a coordinate system encompassing the remote vehicle;
    displaying on the display a remote vehicle representation;
    selecting a location in the 3D local perceptual space;
    displaying an icon at the point selected in the 3D local perceptual space and at a corresponding location in an alternative view of a map having an identified current location of the remote vehicle; and
    controlling the remote vehicle by selecting and transmitting one or more commands to the remote vehicle.

2. The method of claim 1, wherein displaying the remote vehicle representation comprises displaying selectable portions of the remote vehicle, and wherein at least one selectable portion of the remote vehicle representation comprises a chassis, and selecting one or more commands for the remote vehicle further comprises selecting a stair climbing icon.

3. The method of claim 1, wherein displaying the remote vehicle representation comprises displaying selectable portions of the remote vehicle, and wherein at least one selectable portion of the remote vehicle representation comprises a chassis, and selecting one or more commands for the remote vehicle further comprises selecting a location in a video feed of the display to which the remote vehicle will drive.

4. The method of claim 1, wherein displaying the remote vehicle representation comprises displaying selectable portions of the remote vehicle, and wherein at least one selectable portion of the remote vehicle representation comprises a chassis, and selecting one or more commands for the remote vehicle further comprises selecting a location in a map to which the remote vehicle will drive.

5. The method of claim 4, wherein the map displays an environment of the remote vehicle.

6. The method of claim 4, wherein the map comprises a 3D local perceptual space display.

7. The method of claim 1, wherein displaying the remote vehicle representation comprises displaying selectable portions of the remote vehicle, and wherein at least one selectable portion of the remote vehicle representation comprises a manipulator arm, and selecting one or more commands for the remote vehicle further comprises selecting an object in a video feed of the display for the manipulator arm to manipulate.

8. The method of claim 1, wherein displaying the remote vehicle representation comprises displaying selectable portions of the remote vehicle, and wherein at least one selectable portion of the remote vehicle representation comprises a camera, and selecting one or more commands for the remote vehicle further comprises selecting a location in a video feed of the camera that the camera should zoom to.

9. The method of claim 1, wherein displaying the remote vehicle representation comprises displaying selectable portions of the remote vehicle, and wherein at least one selectable portion of the remote vehicle representation comprises a camera, and selecting one or more commands for the remote vehicle further comprises selecting a location on a map that the camera should pan to.

10. The method of claim 9, wherein wherein displaying the interface comprises displaying a point-and-click interface.

11. The method of claim 9, wherein the the coordinate system of the 3D local perceptual space is an egocentric coordinate system.

12. The method of claim 1, further comprising displaying the alternate view of the map from more than one perspective by dragging on a displayed widget that changes the map between at least a top view and a forward view.

13. The method of claim 1, wherein at least one selectable portion of the remote vehicle representation comprises a manipulator arm, and selecting one or more commands for the remote vehicle further comprises selecting an object in the alternate view of the map for the manipulator arm to manipulate.

14. A system for increasing an operator's situational awareness while the operator controls a remote vehicle, the system comprising:
   an operator control unit configured to allow the operator to view an environment surrounding the remote vehicle and control the remote vehicle, the operator control unit displaying:
      a 3D local perceptual space comprising a coordinate system encompassing the remote vehicle;
      a remote vehicle representation; and
      an icon at a point selected in the 3D local perceptual space and at a corresponding location in an alternative view of a map having an identified current location of the remote vehicle; and
      a payload attached to the remote vehicle and in communication with the operator control unit, the payload comprising:
         an integrated sensor suite, and
         a computational module receiving data from the integrated sensor suite and determining the 3D local perceptual space based on the received data.

15. The system of claim 14, wherein the integrated sensor suite comprises a global positioning system, an inertial measurement unit, and a stereo vision camera or a range sensor, and wherein the integrated sensor suite further comprises at least one smart camera module, illuminators, and supporting electronics.

16. The system of claim 14, wherein the interface between the operator control unit and the remote vehicle comprises an Ethernet link from the remote vehicle to the payload and a networked radio link from the payload to the operator control unit.

17. The system of claim 14, wherein the computational module determines a resolved motion of the remote vehicle corresponding to the one or more inputted commands, and wherein the computational module correlates localization sensor data and ranging sensor data to determine the 3D local perceptual space.

18. The system of claim 17, further comprising a Joint Architecture for Unmanned Systems gateway configured to interface with the 3D local perceptual space.

19. The system of claim 14, further comprising a behavior engine configured to provide kinodynamic, real-time motion planning that accounts for the dynamics and kinematics of the remote vehicle.

20. The system of claim 19, further comprising a Joint Architecture for Unmanned Systems gateway configured to interface with the behavior engine.

* * * * *